United States Patent [19]
Lake et al.

[11] Patent Number: 5,350,645
[45] Date of Patent: Sep. 27, 1994

[54] POLYMER-LITHIUM BATTERIES AND IMPROVED METHODS FOR MANUFACTURING BATTERIES

[75] Inventors: Rickie C. Lake, Boise, Id.; John R. Tuttle, Corrales, N. Mex.

[73] Assignee: Micron Semiconductor, Inc., Boise, Id.

[21] Appl. No.: 81,007

[22] Filed: Jun. 21, 1993

[51] Int. Cl.⁵ .................................................. H07M 2/18
[52] U.S. Cl. ........................................ 429/124; 429/130; 429/162; 429/192; 429/246; 29/623.3; 29/623.4
[58] Field of Search ............... 429/124, 130, 162, 246, 429/192, 127; 29/623.3, 623.4

[56] References Cited

U.S. PATENT DOCUMENTS

| | | | |
|---|---|---|---|
| 3,004,903 | 10/1961 | Richter et al. | 29/623.3 |
| 3,437,529 | 4/1969 | Honer | 429/130 X |
| 3,494,796 | 2/1970 | Grylke et al. | 429/127 |
| 3,563,805 | 2/1971 | Deierhoi | 429/162 X |
| 4,158,085 | 6/1979 | Bilhorn | 429/130 |
| 4,502,903 | 3/1985 | Bruder | 156/153 |
| 4,615,959 | 10/1986 | Hayashi et al. | 429/194 |
| 4,621,035 | 11/1986 | Bruder | 429/152 |
| 4,732,825 | 3/1988 | Kamata et al. | 429/162 |
| 4,812,375 | 3/1989 | Foster | 429/101 |
| 4,851,308 | 7/1989 | Akhtar | 429/192 |
| 4,877,694 | 10/1989 | Solomon et al. | 429/27 |
| 4,897,917 | 2/1990 | Gauthier et al. | 29/623.3 |
| 4,911,995 | 3/1990 | Belanger et al. | 429/192 |
| 4,927,514 | 5/1990 | Solomon et al. | 204/290 R |
| 4,963,161 | 10/1990 | Chi et al. | 29/623.5 |
| 5,001,023 | 3/1991 | Cheshire et al. | 429/94 |
| 5,011,749 | 4/1991 | Manassen et al. | 429/101 |
| 5,110,694 | 5/1992 | Nagasubramanian et al. | 429/192 |

Primary Examiner—Stephen Kalafut
Attorney, Agent, or Firm—Stephen A. Gratton

[57] ABSTRACT

Improved polymer batteries and improved methods of manufacturing such polymer batteries are provided. One improved method of manufacture involves the formation of a laminated array structure that includes a number of individual battery cells. After formation of the laminated array the individual batteries are singulated from the array by cutting, shearing or stamping. Other manufacturing improvements include the use of a printing process (e.g. stenciling) to form the cathodes, the use of permanent mask layers to contain and insulate the cathodes and anodes, and the use of a molten lithium deposition process for forming the anodes.

25 Claims, 5 Drawing Sheets

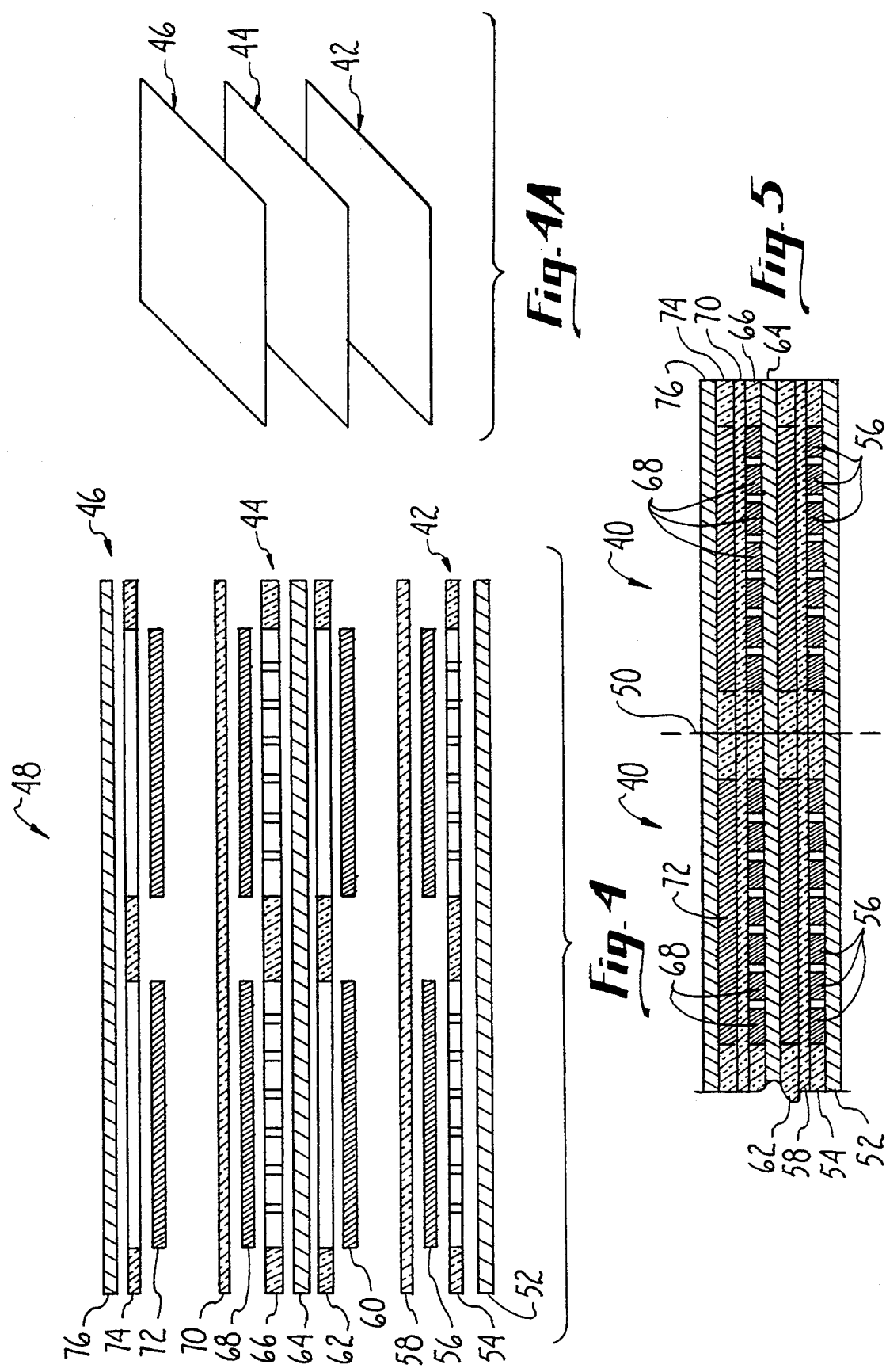

POLYMER-LITHIUM BATTERIES AND IMPROVED METHODS FOR MANUFACTURING BATTERIES

CROSS REFERENCES TO RELATED APPLICATIONS

This application is related to copending application filed Jun. 2, 1993 and entitled "Package and Method for Fabricating a Battery Employing An Alkali-Metal Anode and Polymer Film Inks".

FIELD OF THE INVENTION

This invention relates generally to batteries and more particularly to thin batteries constructed with polymer films. Specifically, the invention is directed to improved polymer batteries and improved methods for making polymer batteries.

BACKGROUND OF THE INVENTION

Advancements in semiconductor technology have led to the production of large scale integrated circuits which have brought about a revolution in the electronics industry. Microelectronic components are now widely used in the production of a variety of electronic devices (e.g. portable computers, calculators, watches, cordless telephones, radios, tape recorders, security systems ). Development of such portable electronic devices has brought about the evolution of batteries as miniature power supplies. This new generation of batteries must produce higher energy per unit volume and superior discharge characteristics as compared to traditional batteries.

The technology related to thin solid state batteries in particular, is being increasingly developed. Typically this type of thin battery is constructed with an alkali metal anode, a non-aqueous electrolyte, and cathodes of nonstoichiometric compounds. Lithium is most often used as an anode material because it has a low atomic weight and is highly electronegative. Such thin batteries have a high energy density, a long shelf life and operate efficiently over a wide range of temperatures.

In the past thin batteries have been manufactured by forming and assembling the anode, electrolyte, and cathode of a battery cell as separate components. This is a relatively labor intensive procedure that involves the intricate assembly of a number of discrete components. In particular, the stamping and handling of individual discs of lithium is costly and difficult, because lithium is expensive and highly reactive.

This has led to the development of continuous manufacturing processes in which the components of a thin battery are constructed using polymeric films. Such thin polymer batteries may include anodes, electrolytes and cathodes formed as a continuous film of a polymeric material. As an example, U.S. Pat. No. 4,621,035 to Bruder, describes a lithium battery that includes a lithium anode formed by laminating lithium to a conductive polymer.

These polymer battery components are typically manufactured by extruding or drawing down suitable materials, such as lithium, onto a flexible polymeric material. In general, this is a relatively complex manufacturing technique which requires relatively complicated and expensive manufacturing equipment. Furthermore, many of the difficulties in manufacturing such polymer batteries are related to handling and assembling the lithium anodes, the cathodic polymers and the electrolytic polymers. These problems are compounded because most prior art manufacturing procedures typically involve the formation of one battery cell at a time.

The present invention is directed to improved polymeric battery structures and improved methods for assembling such polymeric batteries. These improvements lower the manufacturing costs, increase the manufacturing efficiencies and provide improved batteries.

Accordingly, it is an object of the present invention to provide improved polymeric battery structures and particularly improved polymer-lithium batteries. It is a further object of the present invention to provide improved methods for manufacturing polymeric batteries. It is a further object of the present invention to provide improved battery structures that can be manufactured in multiple units and then singulated into individual batteries. It is yet another object of the present invention to provide improved thin polymeric batteries that are high in energy, reliable, light weight and relatively inexpensive to manufacture.

SUMMARY OF THE INVENTION

In accordance with the present invention, improved polymer batteries and improved methods for manufacturing polymer batteries are provided. In an illustrative method of manufacture, a laminated array structure having multiple battery cells (e.g. thirty six) is assembled. The laminated array may be formed by assembling separate stacks for the different components of a battery. For a single cell battery these separate stacks may include, a cathode stack, a separator/electrolyte stack, and an anode stack. Following formation of the laminated array, the individual battery cells are singulated from the array to form the individual batteries.

The laminated array includes multiple battery cells formed by a layered structure that includes; a cathode substrate layer including a patterned cathode mask; a cathode layer formed by depositing a patterned cathodic material onto the cathode substrate layer to form cathodes insulated by the cathode mask; a separator/electrolyte layer in contact with the cathode layer; an anode substrate layer including a patterned anode mask; and an anode layer in contact with the separator/electrolyte layer formed by applying a molten anode material such as lithium to an anode substrate to form anodes separated by the anode mask. Following assembly of the laminated array, the individual batteries may be singulated from the array by a suitable technique such as cutting, shearing or die stamping.

The individual batteries have a laminated structure that includes a cathode substrate (i.e. a current collector), a cathode supported and insulated by the cathodic mask, a separator/electrolyte layer, an anode supported and insulated by the anode mask, and an anode substrate. Furthermore, the laminated array my be formed with more than one stack of cells (e.g. base stack, center stack, top stack) to form a stacked or multi-cell battery structure which provides higher battery voltages.

Such a method of manufacturing batteries using a laminated array and the resultant laminated battery structures are characterized by the following novel and improved features:

1. Discrete, deposited patterns of cathode material (in an array form) are used to minimize electrical shorting of the anode to the cathode during formation of individual battery cells and singulation of the individual battery cells from the array. A preferred method of depositing the cathode material is using a printing process such as pin transfer, screen or stencil printing.

2. The use of permanent mask layers in battery cell fabrication to minimize electrical shorting during formation and singulation of the individual battery cells.

3. The use of permanent mask layers in battery cell fabrication to act as a containment system for the cathode and anode materials.

4. The use of an integral support system (i.e. "studs" provided by the mask layers) that can prevent the separator/electrolyte material from being compressed or pushed into contact with the current collector or displacing the cathode material. This is particularly advantageous on larger or more flexible cells.

5. Staggered, etched or die cut patterns can be used for the anode and cathode substrates (i.e. current collectors) to prevent or minimize electrical shorting during battery cell formation and singulation of the batteries from the array.

6. A thin film of molten lithium (e.g. lithium solder) may be deposited onto a polymer or metallic support film, in either a solid or a discrete pattern (through the use of masks and/or patterned support films) for use as an anode material in polymer-lithium batteries.

7. A higher voltage, "stacked" array of battery cells may be produced using mask layers (or patterning both sides of a single support structure) such that lithium can be clad to one side and the cathode material deposited on the opposite side.

In an alternate embodiment of the invention, a single cell battery structure may be formed by using stenciling techniques instead of conventional extrusion techniques. As an example, a cathode material may be stenciled onto a current collector layer (e.g. copper) using a first stencil. Next, a second stencil slightly larger than the first, and thicker, can be placed over the cathode material pattern without touching it, and an electrolyte layer can be drawn across the cathode and deposited. Next, an anode material can be applied to the electrolyte layer to complete the battery structure.

These and other objects, features and advantages of the invention will be apparent from the following more particular description of the preferred embodiments of the invention as illustrated in the accompanying drawings.

BRIEF DESCRIPTION OF THE DRAWINGS

FIG. 4 is an exploded cross sectional view showing the construction of adjacent cells of a laminated array constructed in accordance with the invention for a stacked battery configuration;

FIG. 4A is an exploded perspective view showing the assembly of the separate panels of a laminated array constructed in accordance with the invent ion for a stacked battery configuration;

FIG. 5 is a partial cross sectional view showing adjacent cells of the laminated array shown in FIG. 4 after assembly;

DETAILED DESCRIPTION OF THE PREFERRED EMBODIMENT

Figure 1:
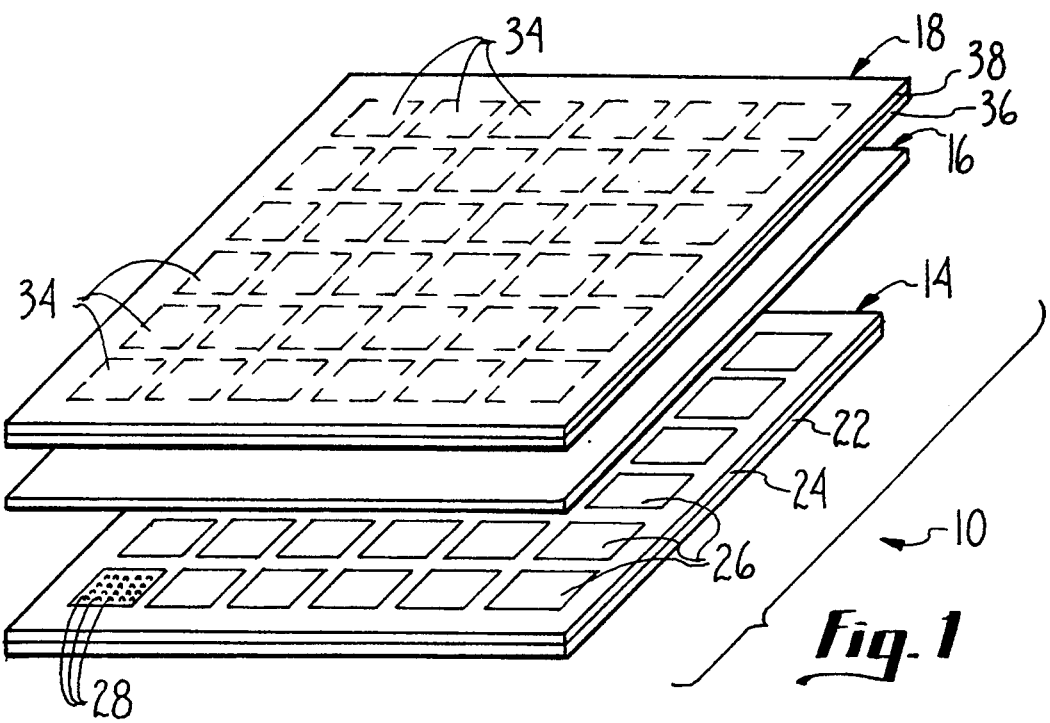
FIG. 1 is an exploded perspective view of a laminated array constructed in accordance with the invention that contains multiple battery cells that will be singulated from the array to form individual batteries.
Figure 2:
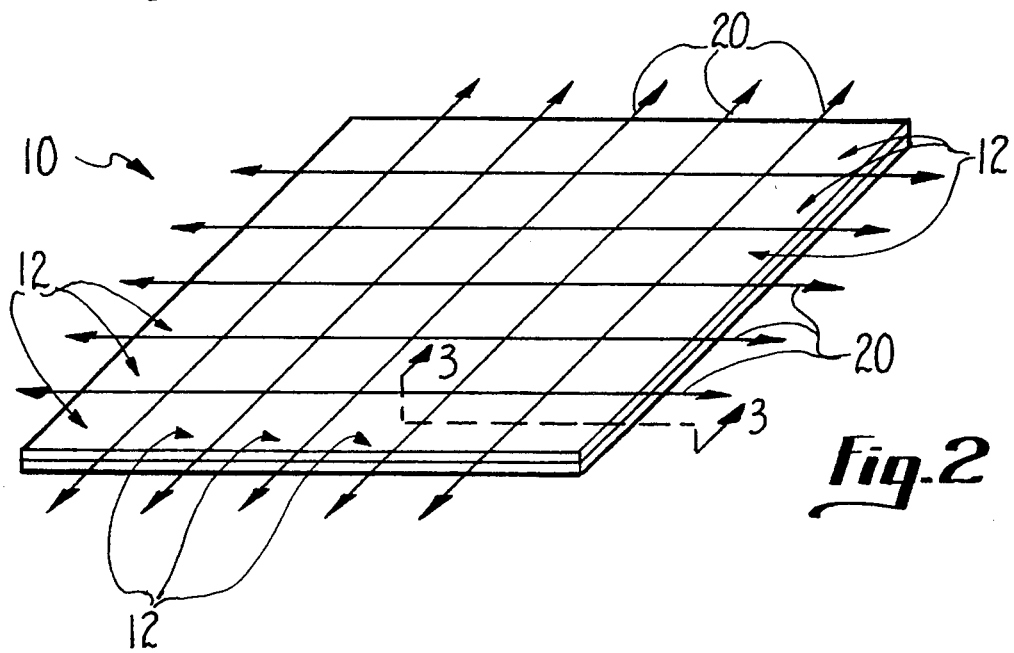
FIG. 2 is a perspective view of the assembled laminated array showing the singulation step for separating the individual battery cells to form a number of individual batteries.
Figure 3:
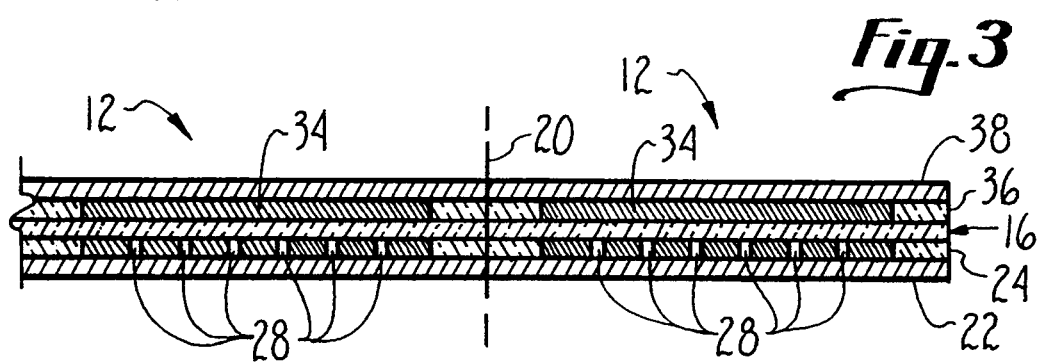
FIG. 3 is a partial cross sectional view through the laminated array taken along section line 3—3 of FIG. 2 showing adjacent battery cells prior to singular ion of the battery cells.

Referring now to FIGS. 1-3, the assembly of a laminated array 10 constructed in accordance with the invention is shown. The laminated array 10 includes a plurality of separate battery cells 12 (FIGS. 2 and 3) that upon formation of the laminated array 10 are singulated to form a plurality of individual batteries. In the illustrative embodiment the laminated array 10 has a square shape and is formed with thirty six separate battery cells 12. Alternately the laminated array may include a lesser or greater number of battery cells.

As shown in FIG. 1, the laminated array 10 is formed in three separate stacks including, a cathode stack 14, a separator/electrolyte stack 16 and an anode stack 18. These stacks 14, 16, 18 can be assembled separately and then lightly pressed together to complete the laminated array 10. The individual battery cells 12 can then be separated or singulated from the laminated array 10 and suitable leads can be formed to the cathode and anodes of the completed battery cells.

The singulation step is represented schematically in FIG. 2 by the cut lines 20. Singulation can be accomplished by cutting, shearing, die stamping or any other suitable method of separating the individual batteries 12 from the laminated array 10.

Figure 6A:
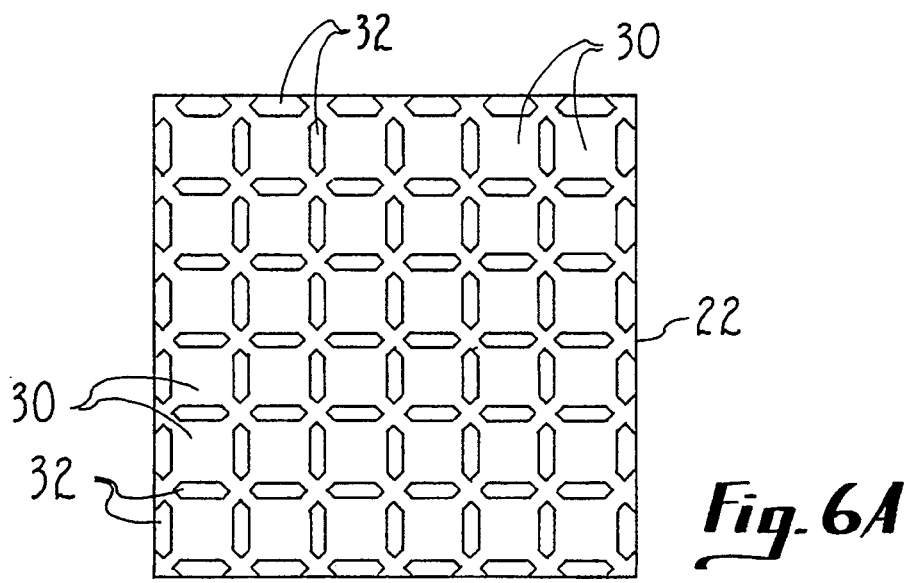
FIG. 6A shows a suitable pattern for a cathode substrate layer for the laminated array shown in FIGS. 4 and 5.

The cathode stack 14 includes a cathode substrate 22, a cathode mask 24, and cathodes 26 formed on the substrate 22 and separated by the cathode mask 24. The substrate 22 functions as a current collector for the cathodes 26 in the separated battery cells 12. As such, the cathode substrate 22 is preferably formed of a conductive material, such as a metal foil (e.g. copper), or a conductive polymer. The cathode substrate 22 may be formed of a solid sheet (i.e. panel) of material or it my be patterned in a configuration that shapes the final battery cells 12. One representative pattern for the cathode substrate 22 is shown in FIG. 6A and includes solid metal areas 30 and die cut/etched areas 32. Each battery cell 12 occupies the generally square solid metal areas 30. The cathode substrate 22 may also include suitable openings (not shown) for connecting leads to the cathodes 26.

The cathode mask 24 is formed of an insulating material. The cathode mask 24 functions as a containment system for the cathodes 26. In addition the cathode mask 24 insulates the cathodes 26 and protects the cathodes 26 structurally and environmentally. Furthermore, the cathode mask 24 provides a webbing between the individual battery cells 12 of the laminated array 10 to reduce the potential of shorting between the cells 12 during singulation of the battery cells 12. The cathode mask 24 may also serve as a pattern for deposition of the cathodes 26 on the cathode substrate 22.

The cathode mask 24 may formed of a thin dielectric material such as an insulating tape (e.g. Kapton tape), or a dielectric paste (e.g. insulating polymer thick film dielectric inks such as DuPont 5014). These materials can be formed in a pattern to retain and insulate the cathodes 26. Moreover, the cathode mask 24 may be patterned to accommodate the shape of the battery cells 12 and the pattern of the cathode substrate 22. In the illustrative embodiment the cathode mask 24 is patterned in squares (36 squares) for the cathodes 26 substantially as shown in FIG. 1. The cathode mask 24 may be formed and patterned in advance as a separate structure by any suitable technique (e.g. die cutting, etching). Alternately, the cathode mask 24 may be formed around the cathodes 26 after formation of the cathodes 26 on the cathode substrate 22.

As clearly shown in FIG. 3, the cathode mask 24 is preferably formed with studs 28 (or standoffs) that will support the separator/electrolyte layer 16 in the completed battery cells 12. The studs 28 also function to prevent the separator/electrolyte layer 16 from being physically pushed through the cathodes 26 to the substrate 22. Moreover, the cathode mask 24 and studs 28 support the cathodes 26 and prevent shorting during the singulation process.

The cathodes 26 are formed by depositing a suitable cathode active material onto the cathode substrate 22. A preferred method of forming the cathodes 26 on the cathode substrate 22 is with a printing process such as a pin-transfer, screen or stencil printing processes. Such pin transfer, screen or stencil printing processes are capable of depositing materials in high volumes and in discrete or irregular patterns. In addition, such printing processes can be performed with relatively inexpensive equipment using relatively simple manufacturing procedures. Furthermore, pin-transfer, screen or stencil printing allows quick changes to be made in the thickness and shape of the deposited materials by changing the pin-array, pin head size, printing screen or stencil with minimal investment in time and equipment. Moreover, such printing process can be used in conjunction with a deposition pattern defined by the cathode mask 24.

Screen and stencil printing are commonly used in the electronics or graphic arts industry to print thick film inks or solder paste. Typically, a squeegee traverses across a patterned screen or stencil to force the material to be deposited through the screen or stencil openings to provide a printed pattern. Equipment commonly used include screen printing machines are available from MPM Corporation, DEK and Presco.

The cathodes 26 may be formed of any suitable cathode active material that can be deposited and patterned on the cathode substrate 22. As an example, the cathodes 26 can be formed of a cathode active material (e.g. iodine) and a polymer (e.g. poly-2-vinylpyridine) that react to form a conductive depolarizer. Such a cathode material can be formulated to flow under the heat and pressure of a pin-transfer, screen or stencil printing process in a desired pattern. Other suitable cathode materials include $MnO_2$, $PbI_2$, $I_2$, $NbSe_2$, $NbSe_3$, $MoS_2$, $MoS_3$, $TiS_2$, $TiS_3$, $TaSe_3$, $TaS_2$, $V_6O_{13}$, $CoO_2$, and $MoO_2$.

The separator/electrolyte stack 16 is formed of a material that will function as a solid electrolyte for the completed battery cells 12. The separator/electrolyte stack 16 thus functions as the medium of transfer of ions between the anodes 34 and cathodes 26 of the battery cells 12. Depending on the cathodic active material that is used, the separator/electrolyte stack 16 may be formed of a suitable solid layer of material. As an example, for a lead iodide cathode 26 the separator/electrolyte stack 16 may be formed from a mixture of lithium iodide and conductivity enhancing alumina. For an iodine cathode, a separator/electrolyte stack 16 my be formed of solid lithium iodide.

Figure 6B:
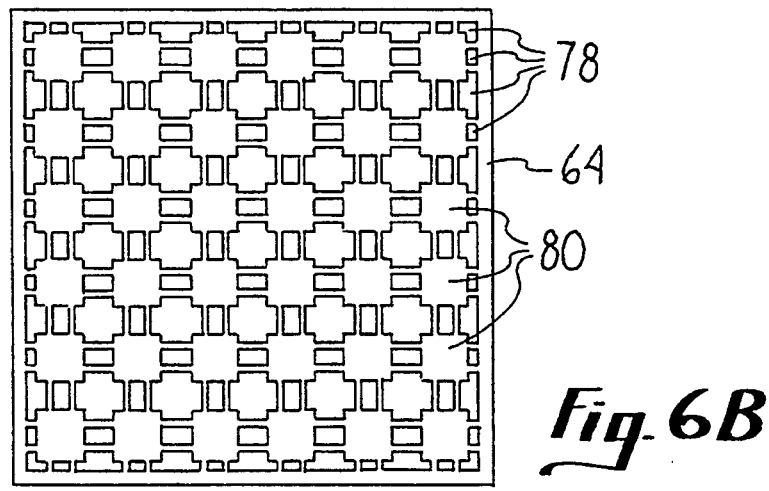
FIG. 6B shows a suitable pattern for a separator layer for the laminated array shown in FIGS. 4 and 5.
Figure 6C:
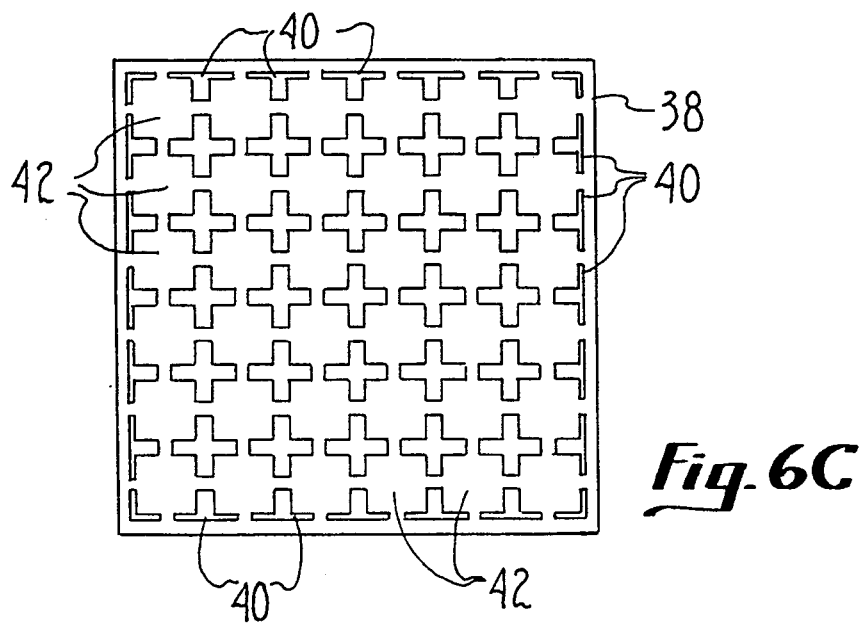
FIG. 6C shows a suitable pattern for an anode substrate layer for the laminated array shown in FIGS. 4 and 5.

Still referring to FIGS. 1-3, the anode stack 18 includes the lithium anodes 34, an anode mask 36, and an anode substrate 38. The anode substrate 38 is preferably formed of a thin metal foil (e.g. copper, stainless steel, nickel). The substrate 38 my be a solid metal foil or may be patterned to save material, prevent shorting and to accommodate the shape of the battery cells 12. One representative pattern for the anode substrate 38 is shown in FIG. 6C and includes die cut/etched areas 40 and solid metal areas 42. The anodes 34 in the completed battery cells 12 rest on the solid metal areas 42.

To form the lithium anodes 34 on the anode substrate 38, molten lithium can be applied to the anode substrate 38 as a patterned solder. Lithium has a relatively low melting point and can therefore be deposited as solder in a suitable pattern. Such a lithium solder manufacturing technique can be used to deposit the pattern of lithium anodes 34 on the anode substrate 38 in much the same way as solders are applied to printed circuit boards. As an example, lithium can be deposited in a square pattern substantially as shown in FIG. 1 onto an anode substrate 38 formed of copper.

The molten lithium deposition may be done similar to wave soldering printed circuit board assemblies. A substrate may be run on a conveyor and across a molten wave of lithium. Lithium melts around 180° C. but because of its highly reactive nature to air in general and moisture in particular, it must be contained in a protective environment such as argon. Typical wave soldering equipment for printed circuit boards is available form Technical Devices, Inc.

Such a solder process can be used in lieu of physically bonding lithium foil to a substrate 38 formed of a different metal foil. Roll bonding lithium foil to another foil is an extremely difficult process with the thin, fragile (84 psi tensile strength) nature of lithium foil. Furthermore, molten lithium can be applied as an extremely thin film; in many cases, far less than 1 mil. This is particularly advantageous as rolled lithium foils are extremely difficult and costly to produce at thicknesses less than 1.5 mils.

Moreover, with lithium anodes 34 formed as a thin film, much less lithium is used in each battery cell 12. This is important for some applications (e.g. airline transported products) because the amount of lithium per battery cell or product is limited due to its inherent, hazardous, reactive nature.

The anode mask 36 may be formed of a dielectric material patterned into a desired shape substantially as previously described for the cathode mask 24. The anode substrate 38 and anode mask 36 form an insulating and supporting webbing between the individual anodes 34 of the battery cells 12. This helps to reduce the possibility of the battery cells 12 shorting together during singulation (e.g. diecutting or shearing) of the individual battery cells 12 from the laminated array 10. As with the cathode mask 24, the anode mask 36 my be formed as a separate structure or following formation of the patterned anodes 34.

Using the process of the invention, battery cells 12 can be manufactured as single cells as shown in FIGS. 1–3. The process of the invention can also be used however, to manufacture stacked or multiple cell batteries. A method of constructing stacked multiple cell batteries is shown in FIGS. 4, 4A, and 5. A pair of adjacent stacked multiple cell batteries 40 separated by a cut line 50 are shown in FIG. 5.

As before, the stacked batteries 40 can be manufactured in a laminated array 48. AS shown in FIG. 4, a laminated array 48 includes a base stack 42, a middle stack 44, and a top stack 46. Moreover, each separate stack 42, 44, 46 is substantially similar in construction to the single cell laminated stack 10 previously described. Each separate stack 42, 44, 46 may be manufactured separately and then lightly pressed together as shown in FIG. 4A to complete the assembly.

With reference to FIG. 4, the base battery stack 42 includes a cathode substrate 52, a cathode mask 54, a cathode layer 56, and a separator/electrolyte layer 58. The middle stack 44 includes a lithium anode layer 60, an anode mask 62, a metal separator layer 64, a cathode mask 66, a cathode layer 68, and a separator/electrolyte layer 70. The top stack 46 includes a second lithium anode layer 72, a second anode mask 74 and a second anode substrate 76.

The separator layer 64 of the middle stack 44 is patterned on one side (upper) with an cathode material and on an opposite side (lower) with anode material. As shown in FIG. 6B, the separator layer 64 can be formed of a solid metal foil having solid metal areas 80 and die cut or etched areas 78. The construction and function of each of the remaining layers is substantially as previously described.

Alternate Embodiments

Figure 7:
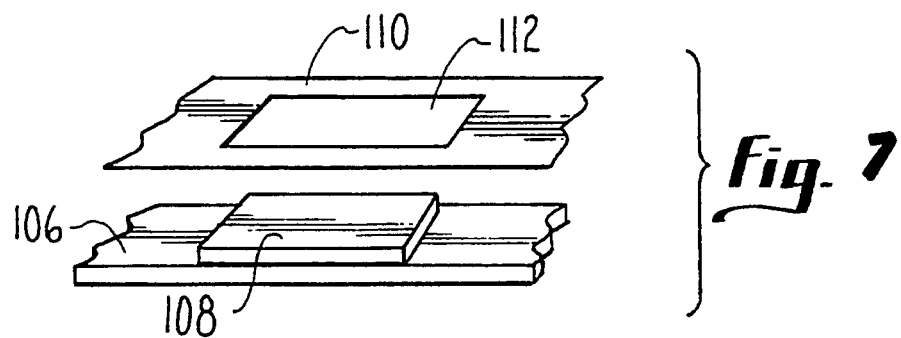
FIGS. 7, 8, and 9 are perspective views showing the assembly of a battery cell using stenciling techniques.
Figure 8:
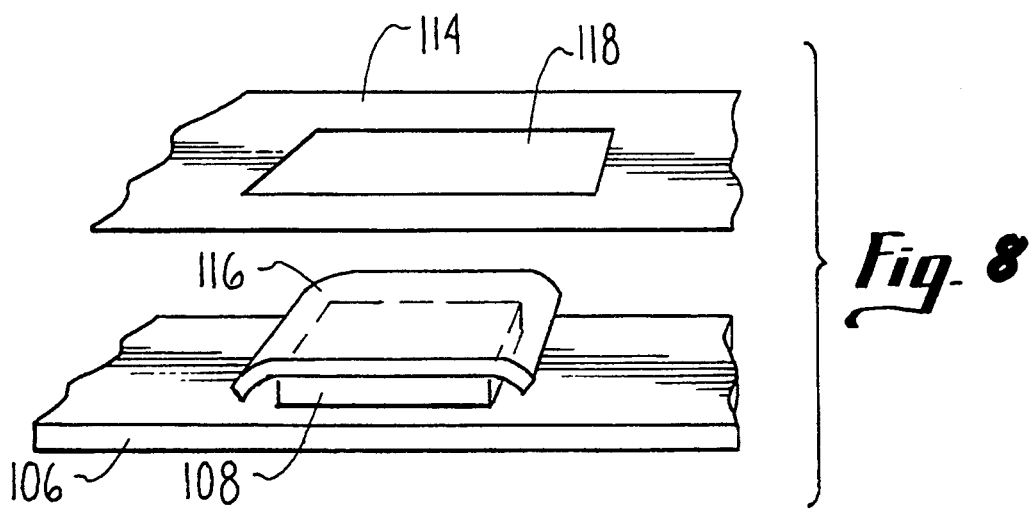
Figure 9:
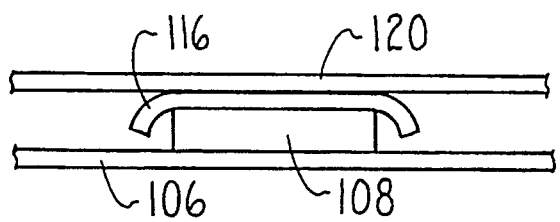

Referring now to FIGS. 7–9 the assembly of a thin battery using stenciling techniques is shown. Such stenciling techniques may be used in the assembly of a single cell battery as shown or in the assembly of a multicell laminated array (e.g., (10) FIG. 1, (48) FIG. 4) as previously described.

Initially and as shown in FIG. 7, a cathode 108 is stenciled onto a current collector 106 using a stencil 110. The stencil 110 is formed of a thin material having an opening 112 sized to form the cathode 108. In addition the thickness of the cathode 108 can be controlled by the thickness of the stencil 110. Following formation of the cathode 108, and as shown in FIG. 8, another stencil 114 is used to form a solid electrolyte 116 over the cathode 108. The opening 118 in the stencil 114 for forming the electrolyte 116, is slightly larger than the cathode 108 such that the electrolyte 116 overlaps opposite edges of the cathode 108 substantially as shown. In addition, the thickness of the electrolyte 116 can be controlled by the thickness of the template 114. Following formation of the electrolyte 116, and as shown in FIG. 9, an anode 120 is formed over the electrolyte.

Figure 10A:
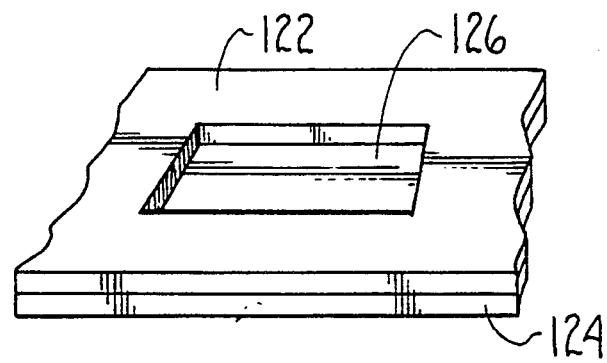
FIGS. 10A–10C are perspective views showing the assembly of a battery cell constructed using stenciling techniques.
Figure 10B:
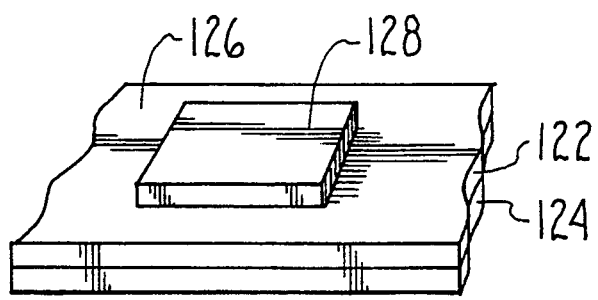
Figure 10C:
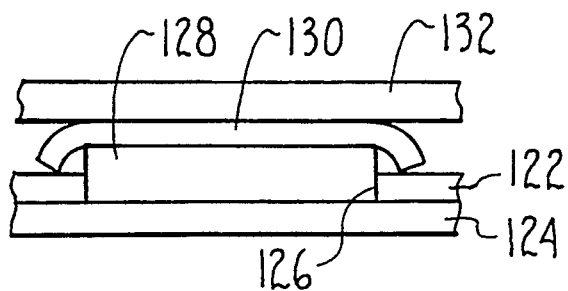

Referring now to FIGS. 10A–10C, another method of assembling a battery using stenciling techniques is shown. As shown in FIG. 10A an insulating paint 122 is applied to a substrate 124 to form the current collector. In place of an insulating paint, a tape such as a "Kapton" tape or a polymer thick film insulating dielectric material may be used. The insulating paint 122 (or tape or polymer dielectric) includes an opening 126 for forming the cathode 128. Next, as shown in FIG. 10B, the cathode 128 is deposited into the opening 126. As shown the cathode 128 is thicker than the depth of the opening 126. Next, as shown in FIG. 10C, the battery cell is completed by formation of a solid electrolyte 130 and anode 132.

Using the disclosed stenciling techniques battery cells can be made simply, quickly and relatively inexpensively. Moreover, such stenciling techniques can be used to make individual testable battery cells or to make an array of cells as previously described.

Although the invention has been described in terms of preferred embodiments, as will be apparent to those skilled in the art, other applications of the inventive concepts disclosed herein are possible. It is intended therefore that the following claims include such alternate embodiments.

What is claimed is:

1. A method for manufacturing thin batteries, comprising:

forming a cathode layer by depositing a cathode material onto a cathode substrate in a pattern to form cathodes;

separating the cathodes with an insulating cathode mask;

forming a separator/electrolyte layer of a solid electrolyte material in contact with the cathodes;

forming an anode layer by depositing an anode material as a patterned solder on an anode substrate to form anodes for contact with the separator/electrolytic layer;

separating the anodes with an insulated anode mask;

combining the separate layers together to form a laminated array structure containing multiple battery cells; and singulating individual battery cells from the laminated array structure.

2. The method as claimed in claim 1 and wherein the cathode layer is formed by depositing a cathode material on the cathode substrate in a discrete pattern using a printing process.

3. The method as claimed in claim 2 and wherein the anode material is lithium.

4. The method as claimed in claim 1 and further comprising forming a second cathode layer, a second separator/electrolyte layer and a second anode layer to form multiple stacked battery cells.

5. The method as claimed in claim 1 and wherein the cathode substrate comprises a patterned metal foil.

6. The method as claimed in claim i and wherein the cathode layer is formed by depositing a cathode material on the cathode substrate using a stencil to pattern the cathode material.

7. The method as claimed in claim 1 and wherein the cathode layer is formed by depositing an insulating paint having a pattern of openings on the cathode substrate and then depositing the cathode material into the openings.

8. The method as claimed in claim 1 and wherein singulating the individual battery cells is by cutting, shearing or stamping.

9. A method of manufacturing thin polymer batteries by forming a laminated array containing multiple battery cells by the steps comprising;

forming a cathode substrate layer of a conductive material;

forming cathodes for the battery cells by depositing a cathode material in a discrete pattern on the cathode substrate layer and separating the cathodes with a cathode mask;

placing a separator/insulator layer in contact with the cathodes;

forming an anode substrate layer of a conductive material;

forming anodes for the battery cells by depositing a molten anode material in a discreet pattern on the anode substrate layer and separating the anodes with an anode mask;

placing the anodes in contact with the separator/insulator layer; and singulating the individual battery cells from the laminated array.

10. The method as claimed in claim 9 and wherein the cathode material is deposited on the cathode substrate using a printing process.

11. The method as claimed in claim 10 and wherein the printing process uses stencils to pattern the cathode material.

12. The method as claimed in claim 11 and wherein the anodes are formed by depositing molten lithium solder in a pattern on the anode substrate.

13. The method as claimed in claim 12 and wherein the cathode substrate is formed of a sheet of patterned metal.

14. The method as claimed in claim 12 and wherein the laminated array is formed with more than one layer of anodes and more than one layer of cathodes to form stacked battery cells.

15. The method as claimed in claim 12 and wherein the cathode mask is formed with studs to prevent the cathodes from being compressed and shorted.

16. The method as claimed in claim 12 and wherein the anode substrate is formed of a sheet of patterned metal.

17. A method of forming a thin battery comprising the steps of:

providing a cathode substrate layer;

depositing a cathode material on the substrate layer using a first stencil formed with a first opening and printing the cathode material through the first opening onto the substrate layer to form a cathode;

depositing an electrolytic material on the cathode using a second stencil formed with a second opening and printing the electrolytic material through the second opening onto the cathode; and forming an anode on the electrolytic material.

18. The method as claimed in claim 17 and wherein the second opening is larger than the first opening and the electrolytic material overlaps opposite sides of the cathode.

19. A thin battery comprising:

a cathode substrate formed of a conductive material;

a cathode deposited in a discrete pattern on the cathode substrate by depositing a cathode material on the cathode substrate using a printing process;

a cathode mask formed on the cathode substrate for separating and insulating the cathode said cathode mask including studs to prevent compression and shorting of the cathode;

a separator/electrolyte layer in contact with the cathode;

an anode deposited in a discrete pattern on a conductive anode substrate in contact with the separator/electrolyte layer and formed by depositing a molten anode material onto the anode substrate; and an anode mask formed on the anode substrate for separating and insulating the anode.

20. The thin battery as claimed in claim 19 and wherein the printing process for depositing the cathode material uses stencils.

21. The thin battery as claimed in claim 19 and wherein the anode is formed of lithium applied as a patterned solder.

22. The thin battery as claimed in claim 19 and wherein the printing process for depositing the cathode material uses insulating paint deposited onto the cathode substrate.

23. The thin polymer battery as claimed in claim 19 and wherein the battery further comprises:

a second cathode formed of a cathode material deposited on the anode substrate by a printing process and insulated by a second cathode mask;

a second separator/electrolyte layer in contact with the second cathode; and a second anode in contact with the second separator/electrolyte layer and formed of an anode material deposited on a second anode substrate.

24. The thin polymer battery as claimed in claim 19 and wherein a plurality of identical batteries are assembled in a laminated array and then singulated from the array.

25. The thin battery as claimed in claim 19 and wherein the separator/electrolyte layer is stenciled onto the cathode.

* * * * *